United States Patent

[11] 3,551,748

| [72] | Inventors | John T. Maynard<br>New Berlin;<br>John E. Lunz, Milwaukee, Wis. |
|---|---|---|
| [21] | Appl. No. | 766,588 |
| [22] | Filed | Oct. 10, 1968 |
| [45] | Patented | Dec. 29, 1970 |
| [73] | Assignee | A. O. Smith Corporation<br>Milwaukee, Wis.<br>a corporation of New York |

[54] POLYPHASE FULL WAVE RECTIFIED POWER CIRCUIT HAVING PHASE DETECTION MEANS
15 Claims, 4 Drawing Figs.

[52] U.S. Cl.................................................. 317/47,
317/48; 318/257; 321/11, 321/13
[51] Int. Cl..................................................... H02h 3/26,
H02p 7/00; H02m 1/18
[50] Field of Search........................................... 317/27, 47,
48; 324/86, 108; 307/92, 138; 321/11, 13, 5,
318/345(Inquired), 257

[56] References Cited
UNITED STATES PATENTS

| 3,215,865 | 11/1965 | Grimme................ | 317/47X |
| 3,401,308 | 9/1968 | Darke..................... | 317/47 |

FOREIGN PATENTS

| 236,086 | 5/1959 | Australia................ | 317/48 |

*Primary Examiner*—William H. Beha, Jr.
*Attorney*—Andrus, Sceales, Starke & Sawall ABSTRACT: This disclosure includes a three-phase full wave rectified system for energizing a motor armature.

A series resistor-capacitor R-C network is connected across each of two different phases with the resistance and the capacitors oppositely connected with respect to a common line. A full wave rectifier and divider establish a positive control signal and a negative control signal which are fed to a logic circuit and establish a control output only in the presence of proper phase sequence and a minimum phase voltage. As a result of the two-phase rectification, a gap occurs in the control output which is overridden by a hold circuit.

PATENTED DEC 29 1970

INVENTORS
John T. Maynard
BY John E. Lunz

Attorneys

3,551,748

POLYPHASE FULL WAVE RECTIFIED POWER CIRCUIT HAVING PHASE DETECTION MEANS

This invention relates to a polyphase full wave rectified power circuit having phase detection means and particularly to a three-phase power supply employing a three-phase alternating current input into a full wave bridge rectifier circuit with a detection means to insure proper phase sequence and a minimum phase input voltage.

Polyphase full wave rectified circuits are widely employed in industrial power application. For example, industrial direct current motors may advantageously be energized from a three-phase full wave rectified power supply. The copending application of John T. Maynard, entitled Dynamoelectric Control Circuit, filed with Ser. No. 713,247 on Mar. 14, 1968, discloses a highly satisfactory motor control system for operating a direct current shunt motor in both a motoring mode and a regenerating mode. The motor armature is connected to a three-phase power supply line through a pair of paralleled full wave rectifier units. Each of the rectifier units employs silicon control rectifiers in each of the several conducting legs with the firing of the control rectifiers established in proper phase control sequenced to control the armature current and thereby the armature torque. The proper operation of the silicon control rectifiers and like devices which are turned off by proper voltage applied to the main conducting elements require the presence of a proper line voltage at all times. If line voltage of a proper phase or magnitude is not connected to the control rectifiers or other similar triggered switch means, there is no voltage to turn the device off and a short circuit condition may then occur with a resulting blowing of fuses and/or damaging of the control rectifiers as well as other components in the circuit.

Generally, if a proper phase sequence connection is made, the danger of damaging effects during a motoring mode of operation as a result of an insufficient peak amplitude of a phase voltage is not as severe as during a regenerating mode of operation. This is true because under motoring conditions, there is a long time period in which to turn off a silicon controlled rectifier. However, under regenerative action, the turnoff period is relatively short and occurs during the maximum period of the applied voltage. If the applied voltage ever drops below the counterelectromotive force or even approaches it, the voltage and time characteristics are such that it will not sufficiently turn off the rectifier and a shoot-through condition is established with a resulting shorted circuit.

The present invention is particularly directed to a relatively simple, reliable and inexpensive circuit for detecting the phase sequence and also the presence or loss of any phase or voltage. Further, the response of the present invention particularly under running conditions is sufficiently rapid to remove power from the phased switch means and shut down the system before disruption of fuses, destruction of the switch means and the like. Further, if a transient or other momentary condition creates a fault with an automatic shutdown, the present system may also provide for automatic reset after removal of the transient.

Generally, in accordance with one aspect of the present invention, a two-phase detection system is connected directly across the three-phase power supply to provide a differential voltage with respect to a correct and incorrect phase connection between the power supply lines and the load. In accordance with this aspect of the present invention, a series resistor-capacitor R-C network is connected across each of two different phases with the resistance and the capacitors oppositely connected with respect to a common line. The voltage sensed across the center junctions of the two-series R-C networks is a relatively high voltage with a proper sequence and a relative low voltage with an improper sequence. The output of this preferred detection system is connected to a full wave rectifier and divider unit to establish a positive control signal and a negative control signal which are fed to corresponding detector units. The output of the detectors are fed to an AND gate or a similar logic device and provide a selected control signal in response to related signals from the two detector units. As a result of the two-phase rectification, there is a slight gap in the output of the two detectors under normal proper operation. In accordance with the present invention the output of the first AND gate or logic unit is fed to a further logic circuit which includes a hold circuit eliminating the dwell period and maintaining proper operation as long as the two-phase rectifier voltages provide proper timed space signals. However, if for any reason an improper phase sequence connection or phase voltage is present, the rectifier phase voltages differ, one of them changing in such a manner as to trigger the logic circuitry and provide a disabling output signal. The circuit thus responds to maintain a disable signal if the phase sequence is reversed, the line voltage is below a given percentage, or if any given phase voltage is lost, either during initial startup of the circuit or under normal operating conditions.

The drawings furnished herewith illustrate the best mode presently contemplated by the inventors of carrying out their invention in which the above advantages and features are disclosed, as well as others which will be readily understood from the following description.

Figure 1:
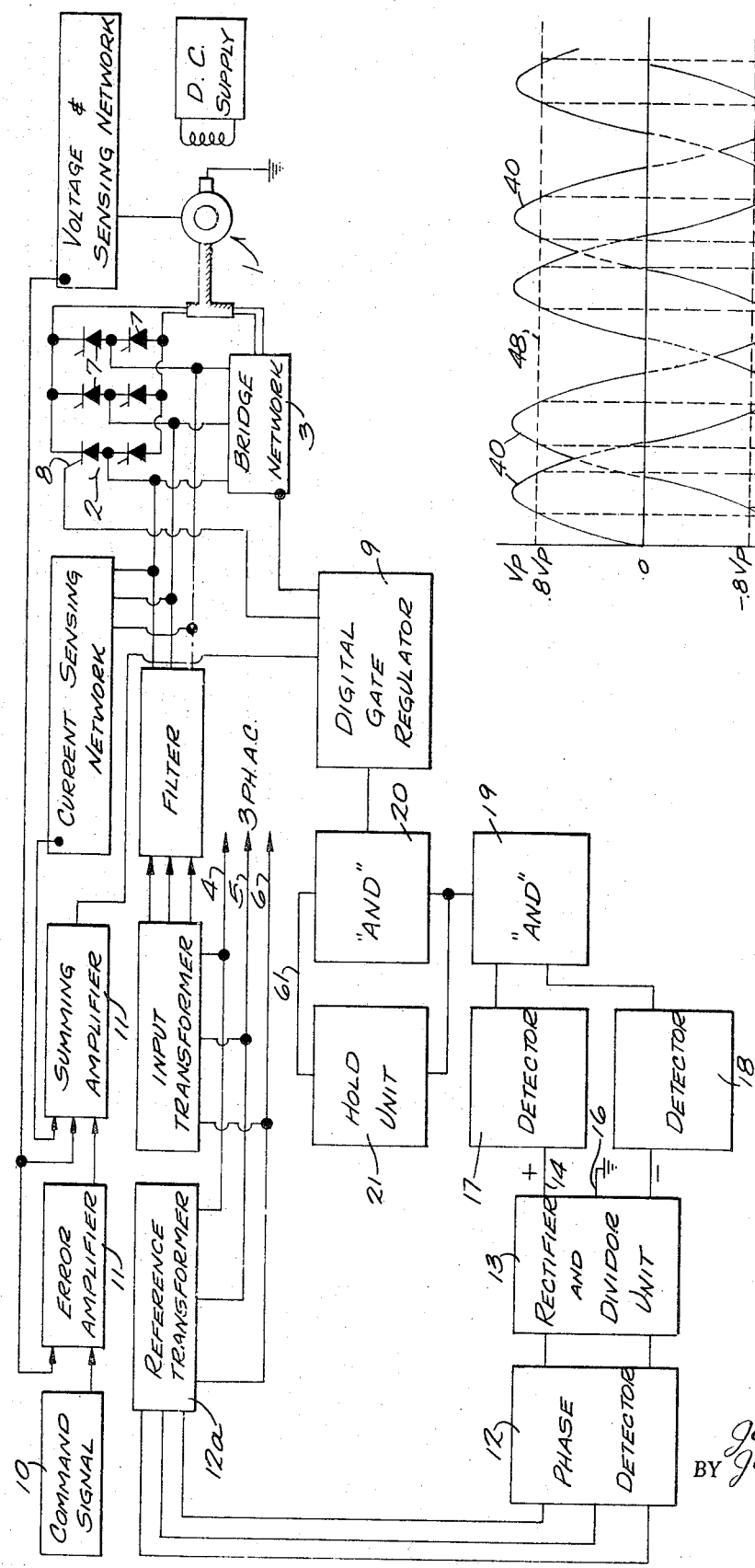
FIG. 1 is a block diagram of a motor control circuit employing a closed, loop control system.

Referring to the drawing and particularly to FIG. 1, the present invention is shown applied to a motor control circuit generally in accordance with the teaching of the previously referred to copending Maynard application. Generally, a single phase direct current motor 1 is connected through a pair of paralleled three-phase full wave bridge rectifier units 2 and 3 to a set of three-phase power lines 4, 5 and 6. Each of the bridge rectifier units 2 and 3 includes silicon controlled rectifiers 7 in each of the six legs of a usual three-phase full wave bridge connection. Each of the silicon control rectifiers 7 similarly is of the usual convention construction having the main anode-cathode circuit connected to the output side of the rectifying units and having a gate 8 interconnected to a gate regulator 9 for controlled firing of the rectifiers 7. The gate regulator 9 has its input connected into a servo or feedback network and is controlled in such a manner as to apply a proper signal to the gates 8 of a pair of rectifiers 7 during either motoring or regenerating of operation of the motor 1 to selectively and properly fire the bridge rectifier units 2 and 3 for conduction with respect to the motor 1. Generally, the output or control signal controlling regulator 9 is derived from a command signal unit 10 which is fed into an amplifying and summing network 11 in combination with suitable motor voltage and motor current feedback signals, as more fully disclosed in the previously referred to Maynard application. The present invention is particularly related to the problems and the fact that the three-phase lines 4, 5 and 6 must be properly interconnected to the bridge rectifying units 2 and 3 and must maintain a phase voltage of a selected magnitude on the anode to cathode circuits of the silicon controlled rectifiers 7 to maintain proper operation of the circuit. This is true because once fired to conduct, the silicon controlled rectifiers 7 remain in a conductive state until such time as the current drops below the holding level or a positive turnoff voltage is applied across the anode to cathode circuit. In a motor circuit, particularly in a regenerating mode where the counterelectromotive force of the armature adds to the line voltage, an improper phase sequence or loss of a sufficient turnoff phase voltage under running conditions maintains the previously fired rectifier conducting with resulting short circuit condition within the circuit.

Generally, in accordance with the illustrated embodiment of the present invention, a phase sequence detection unit 12 is connected across the three-phase lines 4 through 6 inclusive by a voltage reducing reference transformer 12a. The detection unit 12 provides a variable output voltage which is full wave rectified and divided into a negative and positive signal by a rectifier-divider unit 13 having a positive signal line 14 and a negative signal line 15 with respect to a neutral line 16. A positive signal detector unit 17 is connected to lines 14 and 16, and a corresponding negative unit 18 is connected across the negative signal line 15 to neutral line 16. The output of the two detection units 17 and 18 are connected as a dual input to a logic circuit shown as an AND gate unit 19. If the signals from the detection unit 17 and 18 properly reflect the presence of proper phase sequence and a phase voltage of a selected minimum magnitude, the output of the gate unit 19 is an enable signal. Conversely, if such conditions are not maintained, a disable signal is established from 19, as more fully developed hereinafter. The phase sequence detection unit provides a two-phase detection system in which there is a momentary period for approximately 45° during each 180° of the signal when the detection units 17 and 18 do not provide proper phase related output signals. This time period is overlapped automatically by the present invention through an additional logic unit 20 also shown as an AND logic unit, and a hold unit 21. The first input of unit 20 is directly connected to the output of the first AND logic unit 19 and the second input is interconnected through the signal holding unit 21 to the first AND logic unit 19. During the changeover or dwell period, the hold unit 21 maintains proper output from the second AND unit 20 to prevent triggering of a disable system.

Figure 2:
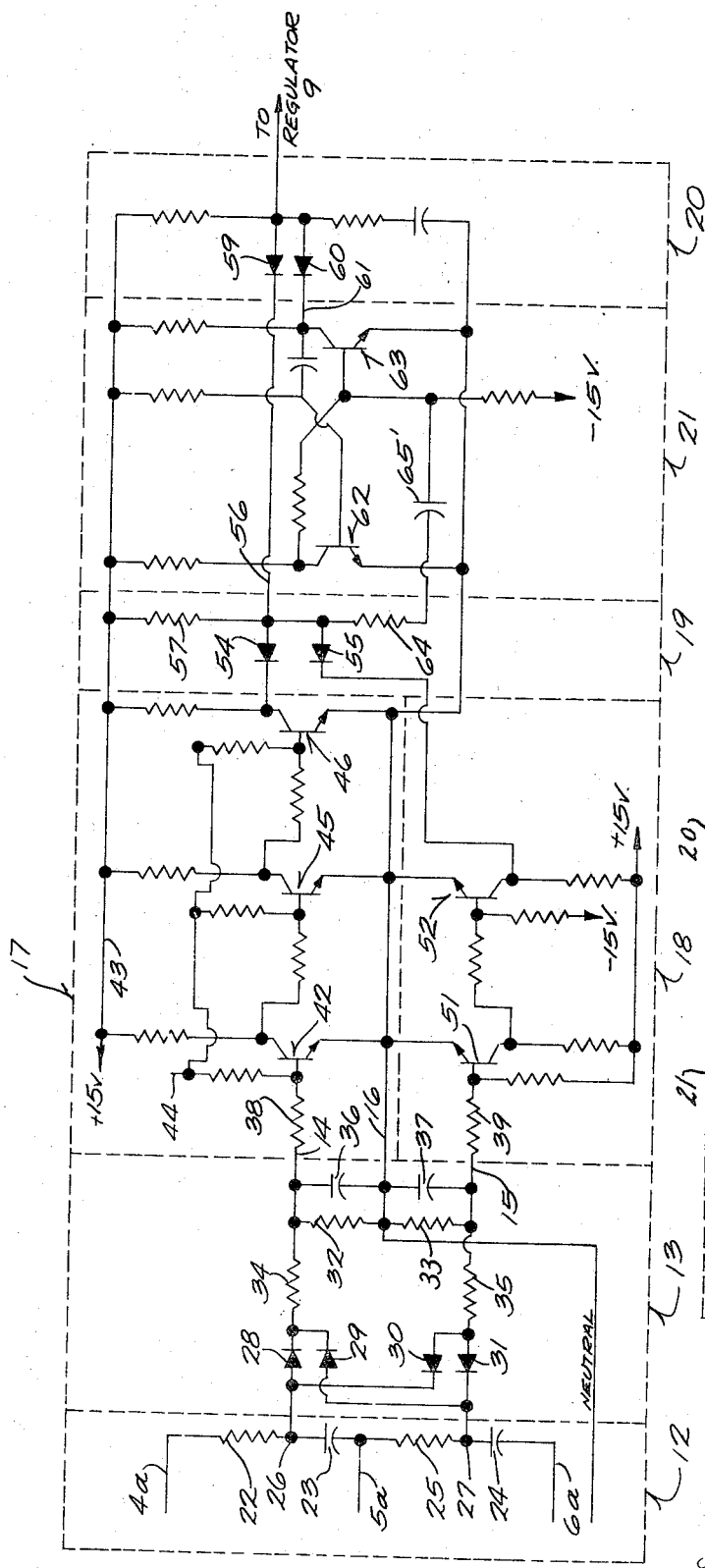
FIG. 2 is a schematic circuit diagram of a preferred circuiting for selected components of the present invention shown in block diagram in FIG. 1.

Referring particularly to FIG. 2, a schematic circuit diagram is shown for the various components shown in block diagram in FIG. 1 of the phase sequence and phase loss response or detection circuitry. The other components of the circuit may take any desired form, for example, that more fully shown in previously referred to copending Maynard application and consequently there is no further detailed description.

Referring particularly to FIG. 2, the phase sequence detection unit 12 is connected to the secondary winding, not shown, of transformer 12a via the lines 4a, 5a and 6a to establish a voltage of a reduced amplitude but otherwise corresponding to the line voltage as in input to unit 12 across lines 4—6. The detection unit 12 includes a first R-C timing circuit having a resistor 22 connected in series with a capacitor 23 across lines 4a and 5a. In the illustrated embodiment, the resistor 22 is connected to line 4a and the capacitor 23 is connected to line 5a. A second R-C or sensing timing circuit includes a capacitor 24 in series with a resistor 25 connected across the input lines 5a and 6a. The second timing circuit has the capacitor 24 connected to line 6a. The second timing circuit has the capacitor 24 connected to line 6a and the resistor connected to line 5a in common with the adjacent end of the capacitor 23. The center points of the two series R-C circuits define signal junctions or points 26 and 27 from which a control signal voltage is taken. The unit 12 is thus connected across and responds to the three phase alternating current voltages appearing across the several phase lines 4—6. In actual practice graphical analysis and tests confirm that a relatively large signal voltage appears across the signal junctions 26 and 27 when, and only when, a selected phase sequence is connected to the lines 4-—6 and only when all three phase voltages are present. If an improper phase sequence is provided, or any one of the phases is lost, the output voltage drops appreciably. The system thus provides a means to directly provide an output signal responsive to both the phase sequence and/or the phase loss. The actual graphical analysis is not shown or described because it follows the usual conventional vector analysis and can be readily followed through by those skilled in the art. Sufficient it is to note that under actual conditions, applicant has found that signal voltage may readily be made to change by a factor of three and one-half to one for complete phase loss or improper phase sequence connection.

The output across the signal junctions 26 and 27 is full wave rectified by a full wave diode bridge consisting of diodes 28 through 31 connected in the conventional wheatstone diode bridge circuit. A pair of voltage dividing resistors 32 and 33 are connected in series across the output of the diodes 28-—31, inclusive, and selectively define the positive and negative signal lines 14 and 15 to the opposite ends thereof with the neutral lines 16 connected to the junction of the resistors. Series resistors 34 and 35 are connected between the diodes 28—31 and the corresponding ends of the resistors 32 and 33 and suitable filtering capacitors 36 and 37 are connected respectively across resistors 32 and 33 to provide an essentially, fully rectified direct current signal which is fed to the detection units 17 and 18. A coupling resistor 38 connects the line 14 to the unit 17 and a coupling resistor 39 connects line 15 to the detection unit 18.

Figure 3:
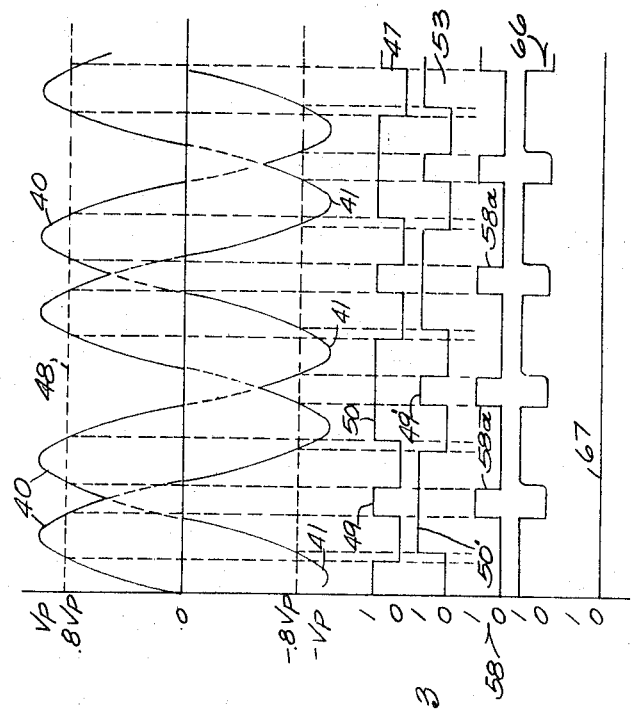
FIG. 3 is a graphical illustration of the output of the circuitry shown in FIGS. 1 and 2.

Generally, the output of the rectifier and divider unit 13 is graphically shown in FIG. 3 with the positive two-phase half cycles trace 40 corresponding to the voltage at line 14 with respect to neutral line 16 and the corresponding negative cycle trace 41 similarly appearing at line 15 with respect to the neutral line 16, and each of the traces being defined by the two phases connected across the sensing circuits. Thus, the positive and negative traces 40 and 41 are each similar time spaced dual peak pulses with pulses in each trace spaced with respect to each other by essentially 45°. The positive half cycle trace 40 is applied to the detection unit 17 and the negative half cycle trace 41 is applied to a corresponding detection unit 18.

The illustrated detection unit 17 has three transistor stages including a first NPN transistor 42 interconnected in a common emitter configuration between a positive bias supply line 43, a negative bias supply line 44 with respect to the neutral or common line 16. The output of the transistor 42 is connected through a pair of cascaded inverter transistors 45 and 46 to square the signal and produce a proper logic type signal at the output of the transistor 46. Both the transistors 45 and 46 are shown as NPN transistors providing a corresponding NPN logic control system. Generally, dual inversion control results in a corresponding logic state for transistors 42 and 46 with the transistor 46 producing a rather sharp output signal, as shown in FIG. 3, at trace 47. Thus, the output of the transistor 46 is either a logic 1 or a logic 0, depending upon the presence and amplitude of the trace 40. In FIG. 3, an arbitrary cutoff level of 80 percent of full line voltage is shown by the horizontal cutoff level line 48. This level is selected by proper bias connection to the sensing transistor 42 and is such that logic 0 is established whenever the input trace rises above the cutoff level. Correspondingly, the output of the transistor 42 and therefore also transistor 46 rises to a logic 1 whenever the signal drops below 80 percent of peak voltage.

Thus, in the illustrated embodiment of the invention, the trace 47 of the output voltage appearing at the transistor 46 rises to a pulse logic 1 as at 49 between the adjacent half cycles of the two-phase full wave rectifier input and similarly rises to a relatively wide logic 1 pulse as at 50 between the successive pulses of the half wave positive signal trace 40. This constitutes the normal input signal to the AND logic unit 19 from the detection unit 17.

The detection unit 18, which forms the other input, includes an NPN transistor 51 connected to the positive bias supply but in such a manner as to normally conduct and thereby establish a logic 0 output. The transistor 51 is further biased to respond and maintain the normal state as long as the negative half cycles of the detected signal are less than 80 percent of the peak value. The output of the transistor 51 is connected to a single inverter transistor 52, the output of which is connected to the AND unit 19. The inverter 52 squares and establishes a pulse signal generally corresponding to the negative signal trace 53 in FIG. 3 which is applied as a second input of the AND unit 19. The trace 53 includes corresponding narrow logic 1 pulses 49' and corresponding wide logic pulses 50', corresponding to the same points in the negative half cycle as the corresponding points of the positive half cycle appear in the positive trace 47 and shifted with respect to each other.

The AND logic unit 19 consists of a pair of diodes 54 and 55 and having their cathodes connected respectively to the output of transistor 46 and the output of transistor 52, respectively. The anodes of diode 54 and 55 are interconnected to a common output line 56 which is connected to the positive supply through a supply resistor 57. If either of the transistors 46 and 52 are conducting, and thus establish a logic 0 state, the output of the first AND logic unit 19 is essentially a logic 0 because it will be held at the neutral line voltage. This is true because either transistor 46 and or 52, when conducting, essentially ties the corresponding diode to the neutral line 16. If both of the transistors 46 and 52 are nonconducting or off, both the diodes 54 and 55 are back biased and the output of the logic unit is held at a logic 1 level. This relationship is shown by the AND output trace 58 in FIG. 3.

It will be noted that during the 45° adjacent the overlap of the two half wave cycles in any given pulse, both of the transistors are cut off and the output of the logic unit rises to a logic 1 level. The particular angle is determined by the cutoff level shown by line 48.

The logic 0 level corresponds to an enable signal indicating proper phase sequence and proper phase voltage. Thus, the logic 1 appearing at 58a in trace 58 provides an erroneous cutoff or disable signal level. In the illustrated embodiment of the invention, the output of the AND circuit 19 is interconnected to the second AND circuit 20 directly and through a hold circuit 21.

The second AND circuit includes a pair of diodes 59 and 60, one of which is connected to the output line 56 and the other of which is connected to the output of the hold circuit 21 via a controlled signal line 61.

The hold circuit 21 is a transistorized monostable circuit including a pair of NPN transistors 62 and 63 interconnected through a suitable resistor capacitive network to each other and to the bias supply lines such that in the stable state, the transistor 62 is conducting and the transistor 63 is cut off. In the illustrated embodiment of the invention, a resistor 64 in series with a capacitor 65 is connected between the input to the transistor 63 and the output line 56 of the first signal AND unit 19. The pulse signal 58 of the unit 19 applied to the transistor 63 results in an inversion of the two conducting states, with transistor 62 turning off and transistor 63 turning on for approximately 60 electrical degrees. The output of the holding circuit 21 at the collector of transistor 63 of the monostable circuit is shown by the trace 66 in FIG. 3 and is a logic 1 except for approximately 60°, beginning with the rising of the output of the first AND logic unit 19 to a logic 1 level. As a result, when the first AND logic rises to a 1, the hold circuit 21 drops to a logic 0 level and the input to the second AND unit 20 is therefore at all times of proper operation a logic 1 and a logic 0, maintaining a logic 0 output as shown at 67 in FIG. 3.

The operation of the illustrated embodiment of the circuit is briefly summarized as follows:

As long as a proper phase sequence and a phase voltage in excess of 80 percent of the peak voltage is present, the output appears as shown in FIG. 3. A change in phase sequence or a loss of any one of the three phases results in a substantial reduction in the output voltage across points 26 and 27. If the phase sequence is reversed, the output voltage is substantially reduced and in actual practice, has been found to be reduced by a factor of approximately three and one-half to one. This reduced voltage output would appear in the logic circuit with the following results. The transistor 42 of unit 17 is normally biased off and is only turned on if the voltage level rises above the 80 percent level. Conversely, the opposite transistor 51 unit 13 is normally biased on and only turned off upon a corresponding large signal voltage appears at its base. With the sequence reversed and the voltage on both the positive and negative cycle reduced below the 80 percent level, the transistors maintain their normal state with the transistor 42 off and the transistor 51 on. The three-stage system associated with transistor 42 maintains a corresponding output at 46 with the output signal at a logic 1 level. Conversely, with the two-stage circuit associated with transistor 51, the transistor 52 is held off and also a logic 1. As a result, the AND logic diodes 54 and 55 are back biased and establish a logic 1 output which constitutes a disable signal. For the short momentary period shown in the traces of FIG. 3, the hold circuit normally provides an override signal to prevent the establishment of a disable signal from the second and logic diodes. However, with the first AND logic maintaining a continuous 1, the hold circuit override disappears and the second AND logic unit rises to a logic 1 level providing the desired disable signal.

If any given phase should decrease below a selected level or drop out completely, a similar action appears within the logic circuit to establish a logic 1 from the first AND logic unit in excess of the override or holding period of the hold circuit. This in turn will establish a disable signal.

In summary, to maintain continuous operation, the phase sequence must be maintained in the selected order and the amplitude must be in excess of 80 percent of the peak amplitude.

A transient or momentary fault condition, of either phase sequence or amplitude, provides a disable signal for a corresponding period. The circuit automatically resets to maintain continuous operation. If the fault is not of a transient or a momentary character, the disable signal is maintained and the circuit disabled until the fault is corrected.

Figure 4:
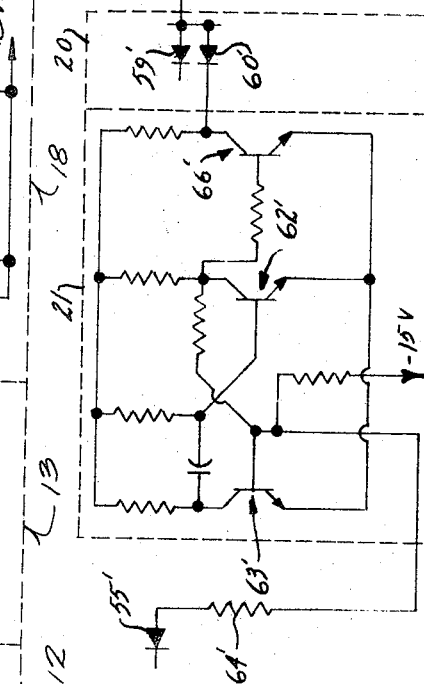
FIG. 4 is a schematic circuit diagram of a modification to FIG. 2.

In FIG. 4, a modification of the monostable circuit for hold unit 21 is illustrated to provide a resistance coupling of the input signal. In FIG. 4, elements are identified by corresponding primed members for simplicity of explanation.

Generally, the monostable circuit, including transistors 62' and 63', is constructed with an inverted logic with the transistor 62' connected as the output transistor and producing a logic 1 output. The output of the AND circuit 19 and particularly diode 55', is coupled directly by resistor 64' to the base of the transistor 63'.

As a result of the inverted logic output of the monostable circuit in FIG. 4, an inverting logic transistor 66 connects the output transistor 62' to the AND circuit 20 and particularly diode 60'.

The circuit of FIG. 4 therefore maintains the same total logic and functions to produce a similar hold action to prevent erroneous creation of a disable signal. The direct coupling of FIG. 4 improves the circuit by minimizing the noise response which appeared in the capacitance coupled circuit of FIG. 2.

The phase sequence and phase amplitude detection system of this invention rapidly responds to disable the circuit before damage can be done to the electrical components or fuses can be blown.

The system of this invention has been found to provide a very reliable and relatively inexpensive phase connection control means.

Various modes of carrying out the invention are contemplated as being within the scope of the following claims particularly pointing out and distinctly claiming the subject matter which is regarded as the invention.

We claim:

1. A polyphase power circuit for energizing a load with a selected phase sequence and only with all phases present, comprising:

a phase shift sensing means connected across two different phases of said power circuit, and establishing a first given alternating current output signal in response to a given phase voltage sequence and characteristic and a substantially different second alternating current output signal in response to an improper phase voltage sequence and characteristic;

converter means connected to the output of said sensing means and having a first output terminal means establishing a first control signal having a detectable characteristic related to the positive half cycles of said phase voltages and having a second output terminal means establishing a second control signal having similar detectable characteristics related to the negative half cycles of said phase voltages; and logic circuit means having a pair of signal detector means connected one each to said first and second output terminal means and providing a pair of logic signals and a logic control means connected to said pair of signal means to provide an enable signal in response to a first characteristic of said first and second control signals and a disable signal in response to a different characteristic of said signals.

2. The polyphase power circuit of claim 1, wherein:

said converter means and logic circuit means establish an essentially continuous enable signal having periodic superimposed disable signals;

a hold circuit means connected to the logic circuit means and establishing a timed signal in response to a disable signal; and second signal inputs connected one to said first logic circuit means and a second to said hold circuit means to override each of said periodic disable signals.

3. The polyphase power circuit of claim 1, wherein:

said converter means includes means to produce binary logic signals in accordance with the amplitude and phase of the voltage of said alternating current output signal and said logic circuit means includes binary logic AND means establishing an essentially continuous enable signal having periodic disable signals of a maximum duration; and a holding means connected to the logic circuit means and establishing a timed signal in response to a disable signal to prevent operative transmission of said disable signal for said maximum duration.

4. The polyphase power circuit of claim 1, wherein:

said converter means includes means to produce binary logic signals in accordance with the amplitude and phase of the voltage of said alternating current output signal;

said logic signals having a first level with the signals above a peak level and a second level with the signals below said peak level and said logic circuit means includes binary logic AND means establishing an essentially continuous enable signal having periodic disable signals;

said periodic disable signal occurring between successive peak voltages when both of said peak levels are below said selected peak phase voltage; and a holding means connected to the logic circuit means and establishing a timed signal in response to a disable signal to prevent operative transmission of said disable signal for said maximum duration.

5. The polyphase power circuit of claim 1, wherein said logic circuit means includes:

a positive polarity detection means connected to said converter means and having a first output signal in response to said first output voltage and a second output signal in response to the second output voltage;

negative polarity detection means connected to said converter means and having a first output signal in response to the second output voltage; and said logic circuit means establishing said enable signal in response to coincidence of said first output signals.

6. The polyphase power circuit of claim 1, wherein:

said phase shift sensing means includes a first phase shift circuit having a first resistor in series with a first capacitor connected across a first input phase and a second phase shift circuit having a second resistor in series with a second capacitor connected across a second input phase and having a common phase line common to both of said phase shift circuits;

said common line being connected to the resistor of one of said phase shift circuits and the capacitor of the other phase shift circuits; and said output signal being taken between the junctions of the resistor and capacitor of each of said phase shift circuits.

7. The power circuit of claim 4, wherein the converter means connected to the output of said sensing means includes means to rectify the alternating current output voltage of the sensing means and establishing a positive signal related to the positive half cycles of said output voltage and a negative signal related to the negative half cycles of said output voltage.

8. The power circuit of claim 4, wherein:

the converter means includes means to rectify the alternating current voltage of the sensing means and having a voltage dividing network with a central neutral line;

a positive polarity detection means connected to one half of the network and having a first logic level signal in response to a voltage of given amplitude and a second logic level signal in response to a lesser voltage;

a negative polarity detection means connected to the opposite half of the voltage dividing network and having a first logic level signal in response to a voltage of a given amplitude and a second logic level signal in response to a lesser voltage; and said logic circuit means having a pair of signal input means connected one to each of said detection means and providing an enable signal in response to presence of said first logic level signals at each input means and a disable signal in response to the absence of last one of said first logic level signals.

9. The power circuit of claim 4, wherein:

the converter means includes means to rectify the alternating current voltage of the sensing means and having a voltage dividing network with a central neutral line;

a positive polarity detection means connected to one half of the network and having a first logic level signal in response to a voltage of given amplitude and a second logic level signal in response to a lesser voltage;

a negative polarity detection means connected to the opposite half of the voltage dividing network and having a first logic level signal in response to a voltage of a given amplitude and a second logic level signal in response to a lesser voltage;

said logic circuit means having a pair of signal input means connected one to each of said detection means and providing an enable signal in response to presence of said first logic level signals at each input means and a disable signal in response to the absence of last one of said first logic level signals, said polarity detection means establishing a periodic disable signal of a predetermined maximum duration; and a hold circuit means connected in the logic circuit means and establishing a timed signal in response to a disable signal to prevent transmission of a disable signal for said predetermined maximum duration.

10. The polyphase power circuit of claim 1, wherein:

said phase shift sensing means includes a first phase shift circuit having a first resistor in series with a first capacitor connected across a first input phase and a second phase shift circuit having a second resistor in series with a second capacitor connected across a second input phase and having a common phase line common to both of said phase shift circuits, said common line being connected to the resistor of one of said phase shift circuits and the capacitor of the other phase shift circuits;

a full wave rectifier connected across the junctions of the resistor and capacitor of each of the shift circuits; and a voltage divider connected across said rectifier and having a central neutral line to define said first signal as a positive direct current signal and said second signal as a negative direct current signal with respect to said neutral.

11. The polyphase power circuit of claim 1, wherein said phase shift sensing means includes a first phase shift circuit having a first resistor in series with a first capacitor connected across a first input phase and a second phase shift circuit having a second resistor in series with a second capacitor connected across a second input phase and having a common phase line common to both of said phase shift circuits, said common line being connected to the resistor of one of said phase shift circuits and the capacitor of the other phase shift circuits, and said output voltage being taken between said last named resistor and capacitor;

a full wave rectifier connected across said last named resistor and capacitor;

a voltage divider connected across said rectifier and having a central neutral line to define said first signal as a positive direct current signal and said second signal as a negative direct current signal with respect to said neutral;

said logic circuit means includes a positive polarity detection amplifier connected to the one side of the divider and a negative polarity detection amplifier connected to the opposite side of the divider;

a pair of diodes connected in common to an output signal line and one each to each of said amplifiers;

a multivibrator having a selected time constant connected to said output line; and a second pair of diodes connected in common to a control output line and one each to each of said first output signal line and to said multivibrator.

12. A three-phase power circuit for energizing a load with a selected phase sequence and only with all three phases present, comprising:

a sensing means connected across two different phases of said three-phase power circuits, and establishing a first output voltage in response to a given three-phase sequence and a substantially different second output voltage in response to an opposite sequence or a two-phase output;

converter means connected to the output of said sensing means and establishing a positive signal related to the positive half cycles of said output voltage and a negative signal related to the negative half cycles of said output voltage;

positive polarity detection means connected to said converter means and having a first logic level signal in response to a first positive signal and a second logic level signal in response to a different positive signal;

negative polarity detection means connected to said converter means and having a first logic level signal in response to said first negative signal and a second logic level signal in response to the different negative signal;

a first AND logic circuit having a pair of signal input means connected one to each of said detection means and providing an enable signal in response to presence of said first logic level signals at each input means and a disable signal in response to the absence of last one of said first logic level signals;

a hold circuit means connected to the first AND logic circuit and establishing a timed signal in response to a disable signal; and a second AND logic circuit having a pair of second signal inputs connected one to said first AND logic circuit and a second to said hold circuit means.

13. The three-phase power circuit of claim 12, wherein the sensing means includes a pair of circuits each including a series connected resistor and capacitor and being connected across one each of said two different phases with the opposite ends thereof connected to a common phase line, said output voltages being taken between the junctions of the resistor and the capacitor in each of said pair of circuits.

14. A polyphase power circuit for controlling a gated semiconductor means connecting a load to a polyphase source with a selected phase sequence and only with all phases present, comprising:

a gating control means;

a phase shift sensing means connected across two different phases of said power source, and establishing a first given output signal in response to a given phase voltage sequence and characteristic and a substantially different second output signal in response to an improper phase voltage sequence and characteristic; and a solid-state amplifier defining a logic signal means having input means connected to said last named means and providing a logic enable signal in response to said first output signal and a logic disable signal in response to said second output signals, said solid-state amplifier being connected to the gating control means to continuously control firing of the semiconductor means.

15. The polyphase power circuit of claim 14, wherein:

said phase shift sensing means includes a first phase shift circuit having a first resistor in series with a first capacitor connected across a first input phase and a second phase shift circuit having a second resistor in series with a second capacitor connected across a second input phase and having a common phase line common to both of said phase shift circuits, said common line being connected to the resistor of one of said phase shift circuits and the capacitor of the other phase shift circuits; and said first and second output signals being taken across the junctions of the resistor and capacitor of each of said phase shift circuit means.

UNITED STATES PATENT OFFICE
CERTIFICATE OF CORRECTION

Patent No. 3,551,748          Dated December 29, 1970

Inventor(s) John T. Maynard and John E. Lunz

It is certified that error appears in the above-identified patent and that said Letters Patent are hereby corrected as shown below:

Column 3, line 52   after "6a." cancel "The second
         line 53    timing circuit has the capacitor
                    24 connected to line 6a."

Column 7, line 20   before "second" insert --a second
                    logic circuit means includes a
                    pair of--

Signed and sealed this 25th day of May 1971.

(SEAL)
Attest:

EDWARD M.FLETCHER,JR.                WILLIAM E. SCHUYLER, JR.
Attesting Officer                    Commissioner of Patents